No. 664,135. Patented Dec. 18, 1900.
C. DUFOUR.
ELECTRIC SWEEPER AND DUST GATHERER.
(Application filed July 31, 1900.)
(No Model.) 2 Sheets—Sheet 1.
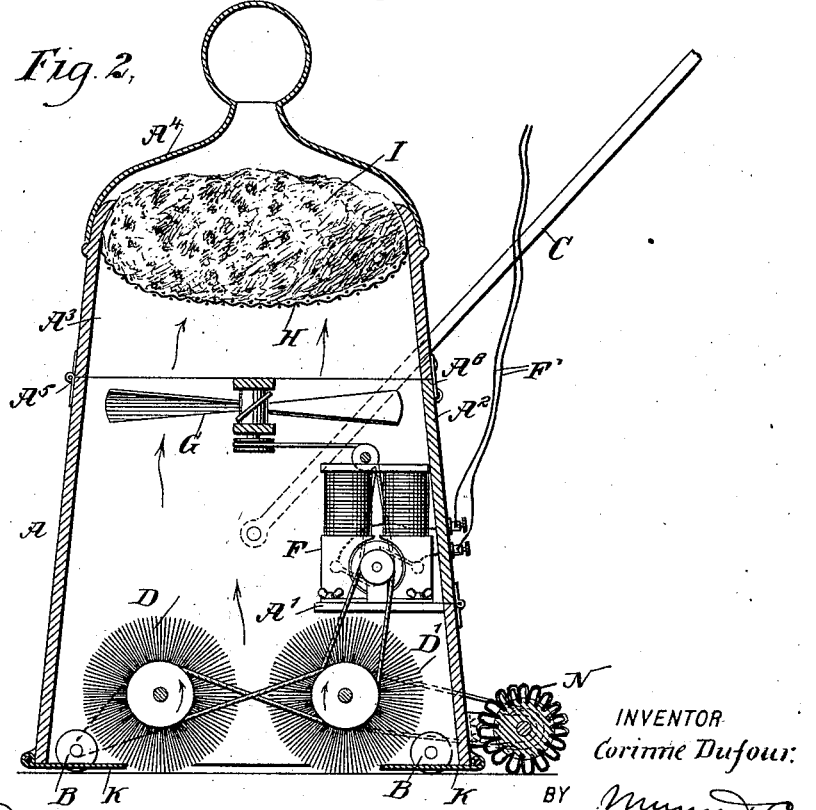
WITNESSES:
E. Thorpe.
INVENTOR
Corinne Dufour.
BY Munn & Co.
ATTORNEYS
THE NORRIS PETERS CO., PHOTO-LITHO., WASHINGTON, D. C.

No. 664,135. Patented Dec. 18, 1900.
C. DUFOUR.
ELECTRIC SWEEPER AND DUST GATHERER.
(Application filed July 31, 1900.)
(No Model.) 2 Sheets—Sheet 2.
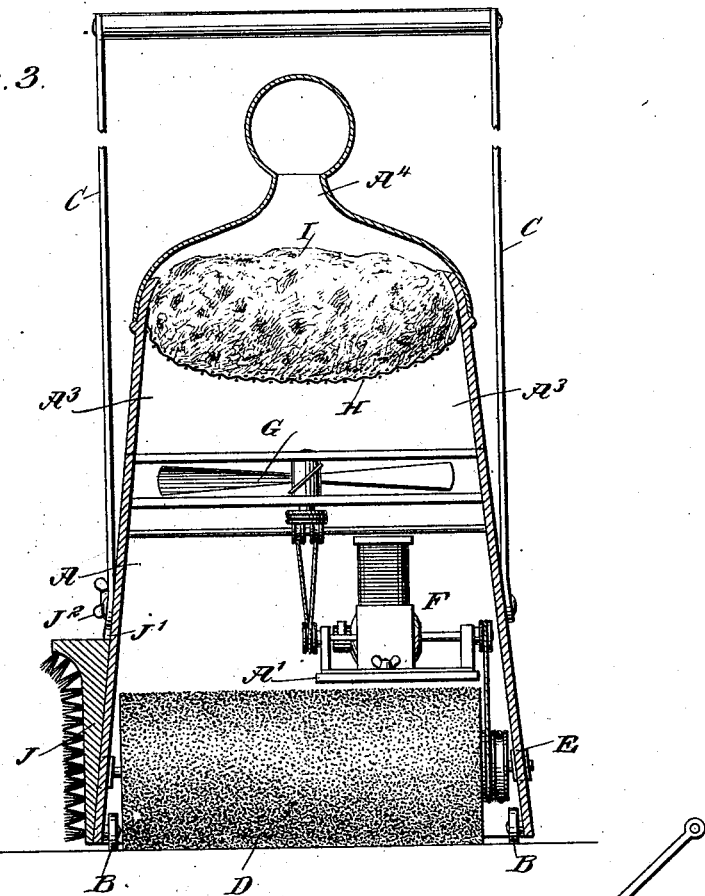
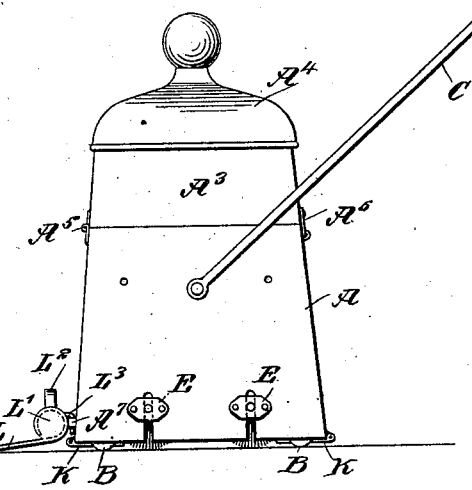
WITNESSES:
E. Thorpe
Rev. J. Foster
INVENTOR
Corinne Dufour.
BY Munn & Co.
ATTORNEYS
THE NORRIS PETERS CO., PHOTO-LITHO., WASHINGTON, D. C.

UNITED STATES PATENT OFFICE.

CORINNE DUFOUR, OF SAVANNAH, GEORGIA.

ELECTRIC SWEEPER AND DUST-GATHERER.

SPECIFICATION forming part of Letters Patent No. 664,135, dated December 18, 1900.

Application filed July 31, 1900. Serial No. 25,425. (No model.)

*To all whom it may concern:*

Be it known that I, CORINNE DUFOUR, a citizen of the United States, and a resident of Savannah, in the county of Chatham and State of Georgia, have invented a new and Improved Electric Sweeper and Dust-Gatherer, of which the following is a full, clear, and exact description.

The object of the invention is to provide a new and improved electric sweeper and dust-gatherer designed for sweeping streets, rooms, halls, and like places, furniture, and other articles and in such a manner that the sweepings and dust are completely taken up, gathered, and retained by the machine for convenient removal from time to time.

The invention consists of novel features and parts and combinations of the same, as will be fully described hereinafter and then pointed out in the claim.

A practical embodiment of the invention is represented in the accompanying drawings, forming a part of this specification, in which similar characters of reference indicate corresponding parts in all the views.

Figure 1 is a side elevation of the improvement. Fig. 2 is an enlarged sectional side elevation of the same. Fig. 3 is an enlarged transverse section of the same, and Fig. 4 is a side elevation of a modified form of the improvement arranged for sweeping streets.

The improved machine is provided with a suitably-constructed casing A, mounted at its lower open end on small wheels B, so as to bring the open bottom of the casing as close as possible to the floor or other surface to be operated upon. On the sides of the casing A are pivoted the forked ends of a handle C, adapted to be taken hold of by the operator for moving the machine over a floor, carpet, or other surface. In the casing, at the lower end thereof, are arranged two removable brushes D D', journaled in suitable bearings E, held vertically adjustable on the sides of the casing A to permit of moving the brushes down as the same wear to bring the bottom faces of the brushes in proper contact with the floor, carpet, or other surface to be operated upon. The brushes D D' are somewhat spaced apart and revolve toward each other and are driven by belts and pulleys from a motor F, adjustably secured on a bracket A', attached to the casing A at the inside thereof, a door $A^2$ being in the end of the casing to afford access to said motor. The motor F is preferably an electric motor having feed-wires F' connected with a source of electricity, the wires being sufficiently long to permit of conveniently moving the machine over the floor or carpet without requiring cutting off the supply of electricity. The electric motor F also operates a suction-fan G, arranged in the casing A above the brushes D D' and the motor, so that the sweepings and dust thrown upward in the casing A by the brushes D D' are forced by the suction-fan G against a wire screen H, containing a sponge, moistened cloth, or similar device I, so that the dust and sweepings readily adhere to it, owing to the moisture therein. The screen H is secured in a hood $A^3$, hinged at $A^5$ to the upper end of the casing and locked thereto by suitable fastening devices $A^6$. The hood $A^3$ is closed on top by a removable cap $A^4$, which permits of having access to the sponge or cloth I to moisten the same or to remove the sponge whenever desired.

On one side of the casing A is arranged a vertically-adjustable brush J, having an outwardly-curved upper portion and adapted to fit against the base-board of a room, so as to clean the base-board by moving the machine over the floor alongside said base-board. The brush J has upwardly-extending arms J', with elongated slots, engaged by thumb-screws $J^2$, carried by the side of the casing and allowing vertical adjustment of the brush to properly fit the base-board.

In order to retain any sweepings or dust thrown by the brushes D D' over on the inside of the casing A, I provide short front and back plates K, extending from the front and rear of the casing inwardly to the brushes, as is plainly shown in Fig. 2, so that any sweepings passing over the brushes are prevented by said back plates K from falling again upon the floor or carpet.

The machine thus far described is more especially serviceable for sweeping carpets and floors, and the arrangement is such that the motor F can be readily removed from the casing when the machine is not to be used as a sweeper to allow of utilizing the motor for driving sewing-machines, fans, and the like.

If desired, the brushes D D' may be driven from one of the rollers B, as indicated by dotted lines in Fig. 2, instead of from the motor F; but I prefer to use the motor, as by the use of the latter the brushes can be rotated at a very high rate of speed to insure a thorough cleaning of the floor or carpet in a comparatively short time. It is expressly understood that the brushes D D' revolve toward each other, so that the sweepings and dust pass up between the brushes and are then forced against the sponge or cloth I by the suction-fan G and retained within the casing until it is desired to remove the gathered sweepings and dust.

When the machine is to be used for street-cleaning purposes, I prefer the addition of a scraper L, as illustrated in Fig. 4, the said scraper having at its rear end a receptacle L', a handle $L^2$, and hooks $L^3$, adapted to engage keepers $A^7$, attached to the front of the casing A, so that the free end of the scraper travels on the street-surface, loosens the dirt thereon, and causes the dirt to travel up the scraper to the receptacle L', in which it is retained for the time being. When the receptacle L' is filled, then the operator takes hold of the scraper by the handle $L^2$ to remove the scraper from the casing and to empty the scraped-up material into a receptacle or to form a pile, as the case may be. The brushes following the scraper L remove the dirt left on the surface of the street by the scraper in the manner above described in reference to the machine shown in Figs. 2 and 3.

When the device is to be used in hospitals, hotels, and like places for cleaning hard-wood or tile floors, then I prefer to use a revoluble mop N on the outside of the rear of the casing, as plainly shown in Fig. 2, the revoluble mop being driven by suitable pulleys and belt from the shaft of the rear brush D', as shown. The revoluble mop is journaled in a bracket adapted to be fastened by thumb-screws or like means to the casing to permit ready attachment or removal of the mop. When the device is moved over the floor, it sweeps the same, gathers up the dust, and mops the floor at the same time.

Having thus fully described my invention, I claim as new and desire to secure by Letters Patent—

A sweeper comprising a casing open at the top, sweeping mechanism therein, a fan in the upper portion of the casing, a movable hood on top of the casing, the hood being open at the top, a dust-absorbing body in said hood, and a cap movably connected with the hood at the top thereof.

In testimony whereof I have signed my name to this specification in the presence of two subscribing witnesses.

CORINNE DUFOUR.

Witnesses:
J. E. MYRICK,
GEO. W. OWENS.